(12) United States Patent
Ueda et al.

(10) Patent No.: US 12,304,532 B2
(45) Date of Patent: May 20, 2025

(54) ARTICLE CONVEYANCE APPARATUS

(71) Applicant: DAIFUKU CO., LTD., Osaka (JP)

(72) Inventors: Yuichi Ueda, Shiga (JP); Osamu Matsui, Shiga (JP); Hiroyuki Koide, Shiga (JP); Atsushi Ishikura, Shiga (JP)

(73) Assignee: DAIFUKU CO., LTD., Osaka (JP)

( * ) Notice: Subject to any disclaimer, the term of this patent is extended or adjusted under 35 U.S.C. 154(b) by 907 days.

(21) Appl. No.: 17/440,412

(22) PCT Filed: Nov. 6, 2019

(86) PCT No.: PCT/JP2019/043355
§ 371 (c)(1),
(2) Date: Sep. 17, 2021

(87) PCT Pub. No.: WO2020/188876
PCT Pub. Date: Sep. 24, 2020

(65) Prior Publication Data
US 2022/0161832 A1     May 26, 2022

(30) Foreign Application Priority Data

Mar. 20, 2019   (JP) ................. 2019-052030

(51) Int. Cl.
*B61B 13/00*   (2006.01)
*B61G 7/00*   (2006.01)
(Continued)

(52) U.S. Cl.
CPC .............. *B61B 13/00* (2013.01); *B61G 7/00* (2013.01); *B65G 17/12* (2013.01); *B65G 17/26* (2013.01);
(Continued)

(58) Field of Classification Search
CPC ...... B61B 13/00; B65G 17/345; B65G 17/38; B65G 17/12; B65G 17/26; B65G 47/46;
(Continued)

(56) References Cited

U.S. PATENT DOCUMENTS 5,540,319 A    7/1996 Orisaka et al.
5,839,567 A    11/1998 Kyotani et al.
(Continued)

FOREIGN PATENT DOCUMENTS

CN    1468767 A    1/2004
CN    102344035 A    2/2012
(Continued)

OTHER PUBLICATIONS

Decision to Grant a Patent (and its English-language translation) dated Feb. 8, 2022 in corresponding priority Japanese Patent Application No. 2019-052030.
(Continued)

*Primary Examiner* — Zachary L Kuhfuss
*Assistant Examiner* — James William Jones
(74) *Attorney, Agent, or Firm* — RENNER, OTTO, BOISSELLE & SKLAR, LLP (57) ABSTRACT

An article conveyance apparatus couples a plurality of conveyor carriages for conveying articles and enables the coupled conveyor carriages to travel along a conveyance path K. The conveyor carriage is coupled by a coupling part to another conveyor carriage placed in the longitudinal direction with respect to a traveling direction H of the conveyor carriage. The conveyor carriage includes a load cell that is provided in the coupling part and measures a force applied between the conveyor carriages, and a controller that calculates a force F applied to wheels of the conveyor carriage, based on a tension T between the conveyor carriages calculated according to the force applied between the conveyor carriages and measured by the load cell.

4 Claims, 5 Drawing Sheets

(51) Int. Cl.
  *B65G 17/12* (2006.01)
  *B65G 17/26* (2006.01)
  *B65G 17/34* (2006.01)
  *B65G 17/38* (2006.01)
  *B65G 23/02* (2006.01)
  *B65G 35/06* (2006.01)
  *B65G 47/00* (2006.01)
  *B65G 47/46* (2006.01)
  *B65G 47/96* (2006.01)
  *G01L 5/00* (2006.01)
  *B61D 49/00* (2006.01)

(52) U.S. Cl.
  CPC .......... *B65G 17/345* (2013.01); *B65G 17/38* (2013.01); *B65G 23/02* (2013.01); *B65G 35/06* (2013.01); *B65G 47/00* (2013.01); *B65G 47/46* (2013.01); *B65G 47/96* (2013.01); *G01L 5/00* (2013.01); *B61D 49/00* (2013.01); *B65G 2203/0266* (2013.01); *B65G 2203/04* (2013.01); *B65G 2203/042* (2013.01)

(58) Field of Classification Search
  CPC ........ B65G 47/96; B65G 47/00; B65G 35/06; B65G 2203/0266; B65G 2203/04; B65G 2203/02912; B65G 23/02; G01L 5/00; B61G 7/00; B61D 49/00
  USPC ........................................ 104/165
  See application file for complete search history.

(56) References Cited

U.S. PATENT DOCUMENTS

| | | | | |
|---|---|---|---|---|
| 7,926,427 | B1* | 4/2011 | Ricks | ............ A63H 19/18 213/77 |
| 2003/0229416 | A1 | 12/2003 | Tai et al. | |
| 2010/0294848 | A1* | 11/2010 | Bullis | ............ B60B 17/0072 188/41 |
| 2011/0270475 | A1* | 11/2011 | Brand | ............ B61L 15/0027 701/19 |
| 2014/0129109 | A1* | 5/2014 | Meyer | ............ B61L 15/0081 701/82 |
| 2016/0046453 | A1 | 2/2016 | Fujio et al. | |
| 2016/0355349 | A1* | 12/2016 | Chierego | ............ B65G 43/08 |
| 2017/0057750 | A1 | 3/2017 | Ikenaga et al. | |
| 2018/0229748 | A1 | 8/2018 | Nakamura et al. | |
| 2018/0364117 | A1* | 12/2018 | Seidel | ............ G01L 5/00 |
| 2019/0054907 | A1 | 2/2019 | Skrabak et al. | |
| 2019/0263597 | A1 | 8/2019 | Fujio | |

FOREIGN PATENT DOCUMENTS

| | | | |
|---|---|---|---|
| CN | 105102353 | A | 11/2015 |
| CN | 108438034 | A | 8/2018 |
| JP | H03-158315 | A | 7/1991 |
| JP | 7-41161 | A | 2/1995 |
| JP | 2005-255331 | A | 9/2005 |
| JP | 2009208957 | A * | 9/2009 |
| JP | 2013-107731 | A | 6/2013 |
| JP | 5862224 | B2 | 2/2016 |
| JP | 2018-079989 | A | 5/2018 |
| JP | 2018-122986 | A | 8/2018 |
| JP | 2018/122988 | A | 8/2018 |
| TW | 275611 | B | 9/1984 |
| WO | WO 2019/001951 | A1 | 1/2019 |

OTHER PUBLICATIONS

Decision to Grant (with English machine translation) dated Apr. 28, 2023 in the corresponding Chinese Patent Application No. 201980093800.3.
Office Action (with English machine translation) dated May 5, 2023 in the corresponding Taiwanese Patent Application No. 108141699.
International Search Report from corresponding International Patent Application No. PCT/JP19/43355, dated Jan. 28, 2020.

* cited by examiner

ARTICLE CONVEYANCE APPARATUS

FIELD OF THE INVENTION

The present invention relates to an article conveyance apparatus that couples a plurality of conveyor carriages for conveying articles and enables the coupled conveyor carriages to travel along a conveyance path.

BACKGROUND OF THE INVENTION

As a conventional article conveyance apparatus of this type, an article conveyance apparatus described in Japanese Patent Laid-Open No. 2005-255331 is available, for example.

The article conveyance apparatus described in Japanese Patent Laid-Open No. 2005-255331 includes a plurality of conveyor carriages that move along rails. The conveyor carriages adjacent to each other in a moving direction are coupled to each other by a coupling part. In the article conveyance apparatus described in Japanese Patent Laid-Open No. 2005-255331, the conveyor carriages are moved along the loop rails. When the conveyor carriages reach desired sorting positions, articles on the conveyor carriages are sorted to the sorting positions.

In such a conventional article conveyance apparatus, wheels are provided between the conveyor carriages while a tension between the conveyor carriages is kept at a predetermined tension, allowing the conveyor carriages to stably travel along a conveyance passage.

In the conventional article conveyance apparatus, when the tension between the conveyor carriages decreases so as to apply a compressive force between the conveyor carriages, the wheels provided between the conveyor carriages float from a traveling surface. Thus, the conventional article conveyance apparatus requires periodic detection of the tension between the conveyor carriages. In the conventional article conveyance apparatus, unfortunately, the tension between the conveyor carriages can be detected only when the conveyor carriages are stopped, requiring the all conveyor carriages to be stopped each time the tension between the conveyor carriages is detected. This may cause low operation efficiency.

Furthermore, in the conventional article conveyance apparatus, whether the wheels are floating from the traveling surface is determined by detecting the tension between the conveyor carriages, however, the tension between the conveyor carriages cannot be detected during the travel of the conveyor carriages, so that floating of the wheels from the traveling surface cannot be determined during the travel of the conveyor carriages. Thus, the wheels cannot be prevented from floating from the traveling surface.

SUMMARY OF THE INVENTION

An object of the present invention is to provide an article conveyance apparatus that can detect a tension between conveyor carriages during the travel of the conveyor carriages.

Solution to Problem

This is the problem to be solved by the present invention, and a solution to solve the problem will be described below.

Specifically, an article conveyance apparatus according to the present invention is an article conveyance apparatus that couples a plurality of conveyor carriages for conveying articles and enables the coupled conveyor carriages to travel along a conveyance path, wherein the conveyor carriage is coupled by a coupling part to another conveyor carriage placed in a longitudinal direction with respect to a traveling direction of the conveyor carriage, and the conveyor carriage includes a measuring unit that is provided in the coupling part and measures a force applied between the conveyor carriages, a tension calculation unit that calculates a tension between the conveyor carriages based on the force applied between the conveyor carriages measured by the measuring unit, and a calculation unit that calculates a force applied to wheels of the conveyor carriage, based on the tension between the conveyor carriages calculated by the tension calculation unit.

In the configuration, the force applied to the wheels of the conveyor carriage is calculated based on the tension between the conveyor carriages.

In the article conveyance apparatus according to the present invention, the measuring unit is provided in at least two of the coupling parts provided for respective gaps between the conveyor carriages.

In the configuration, the force applied to the wheels of the conveyor carriage is calculated by calculating the tension between the conveyor carriages based on the force applied between the conveyor carriages measured by the measuring unit provided in at least two of the coupling parts provided for the respective gaps between the conveyor carriages.

In the article conveyance apparatus according to the present invention, the measuring unit includes a load cell.

In the configuration, the force applied between the conveyor carriage is measured by the load cell.

In the article conveyance apparatus according to the present invention, the measuring unit is provided in the conveyor carriage, and the tension calculation unit and the calculation unit are provided on a ground side where the conveyor carriages travel.

In the configuration, the force applied between the conveyor carriage is measured by the conveyor carriage while the tension between the conveyor carriages and the force applied to the wheels of the conveyor carriage are calculated on the ground side.

Advantageous Effects of Invention

According to the article conveyance apparatus of the present invention, the tension between the conveyor carriages is calculated by measuring the force applied between the conveyor carriages by means of the measuring unit provided in the conveyor carriage. This can detect the tension between the conveyor carriages during the travel of the conveyor carriages and eliminate the need for stopping the all conveyor carriages each time the tension between the conveyor carriages is detected, thereby improving operation efficiency.

Since the force applied to the wheels is calculated during the travel of the conveyor carriages, the floating of the wheels from a traveling surface can be predicted during the travel of the conveyor carriages, thereby preventing the wheels from floating from the traveling surface.

DETAILED DESCRIPTION OF THE INVENTION

An article conveyance apparatus 10 according to an embodiment of the present invention will be described below.

Figure 1:
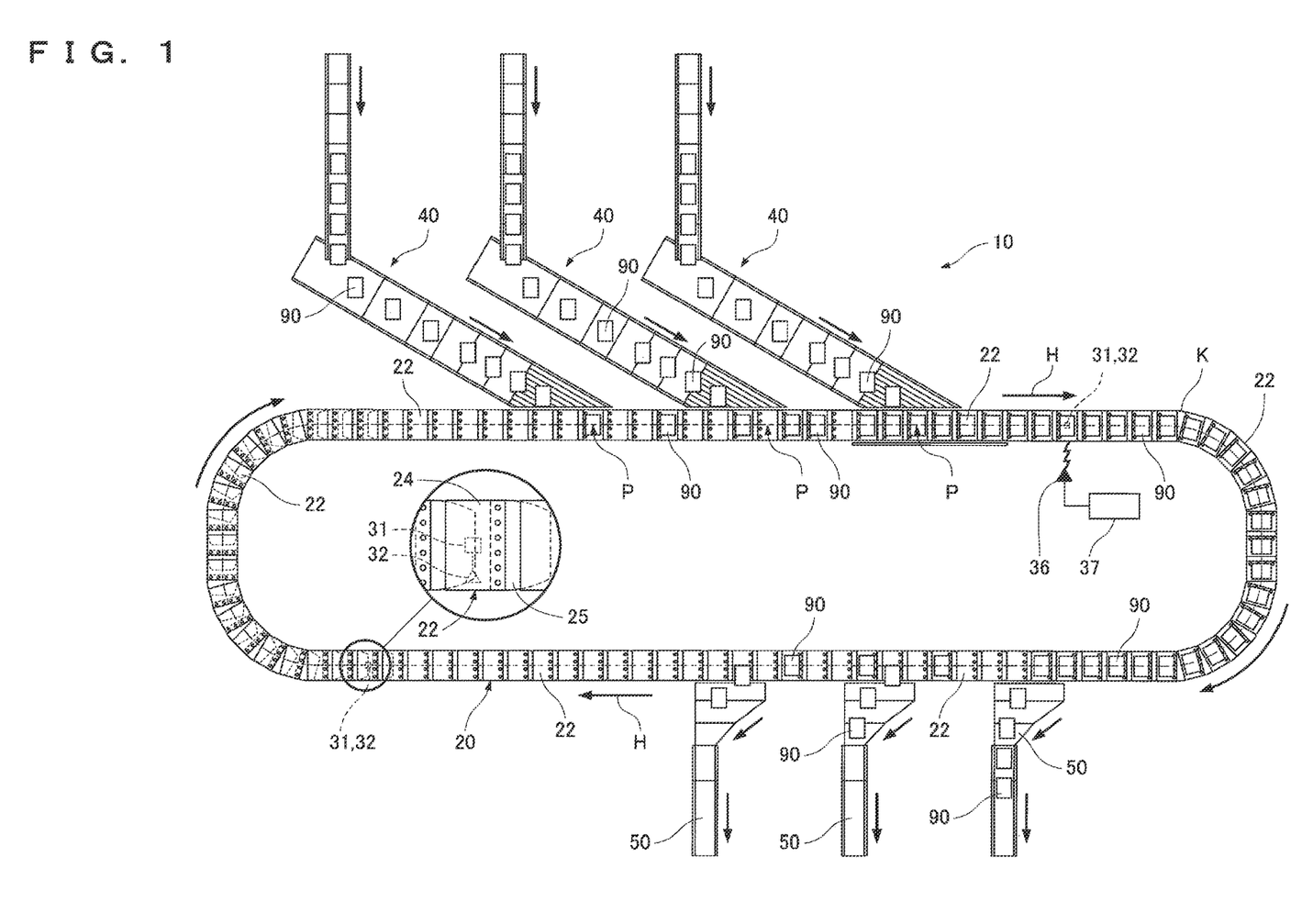
FIG. 1 is a schematic plan view illustrating an article conveyance apparatus according to the present invention.

As illustrated in FIG. 1, a loop conveyance path K is formed in the article conveyance apparatus 10. The article conveyance apparatus 10 mainly includes a main conveyor device 20 for conveying articles 90 along the conveyance path K, a plurality of induction conveyors 40 for loading the articles 90 onto the conveyance path K of the main conveyor device 20, and a plurality of chutes 50 for receiving the articles 90 unloaded from the conveyance path K of the main conveyor device 20. In the article conveyance apparatus 10, the articles 90 are loaded onto the conveyance path K of the main conveyor device 20 from the predetermined induction conveyors 40. The articles 90 to be loaded onto the conveyance path K are received at article-loading positions P by the main conveyor device 20. The articles 90 are conveyed by conveyor carriages 22 traveling on the conveyance path K. The articles 90 conveyed by the conveyor carriages 22 are unloaded into the chutes 50. To the chutes 50, stores are allocated as the destinations of the sorted articles 90. The articles 90 are unloaded into the chutes 50 so as to be sorted into the stores allocated to the respective chutes 50.

As illustrated in FIG. 1, the induction conveyor 40 on one side of the conveyance path K diagonally conveys the article 90 from the upstream side to the downstream side of a traveling direction H of the conveyor carriages 22, and loads the articles 90 onto a conveyor carriage 22 while keeping the orientation of the conveyed article 90. The plurality of induction conveyors 40 (three in FIG. 1) are provided along the conveyance path K. The induction conveyors 40 are provided at the respective article-loading positions P (positions where the induction conveyors 40 load the articles 90 onto the conveyor carriages 22) at multiple points (three points in FIG. 1) on the conveyance path K. In the induction conveyors 40, the conveyor carriages 22 to be loaded with the articles 90 are searched for in advance, and the conveyor carriages 22 to be loaded with the articles 90 are determined, for each of the induction conveyors 40. The induction conveyors 40 load the articles 90 onto the predetermined conveyor carriages 22 that are determined for each of the induction conveyors 40.

As illustrated in FIG. 1, the chute 50 receives the article 90 unloaded from the conveyor carriage 22 and conveys the received article 90 to another downstream apparatus (e.g., a shipping apparatus) or directly to vehicles (e.g., a truck) or the like. The plurality of chutes 50 (three in FIG. 1) are provided along the conveyance path K. The chutes 50 each receive the predetermined articles 90 from the conveyor carriages 22. The chute 50 is a combination of, for example, plate members such as an iron plate, roller conveyors, and belt conveyors. The chutes 50 are tilted downward from above with respect to the main conveyor device 20.

Figure 2:
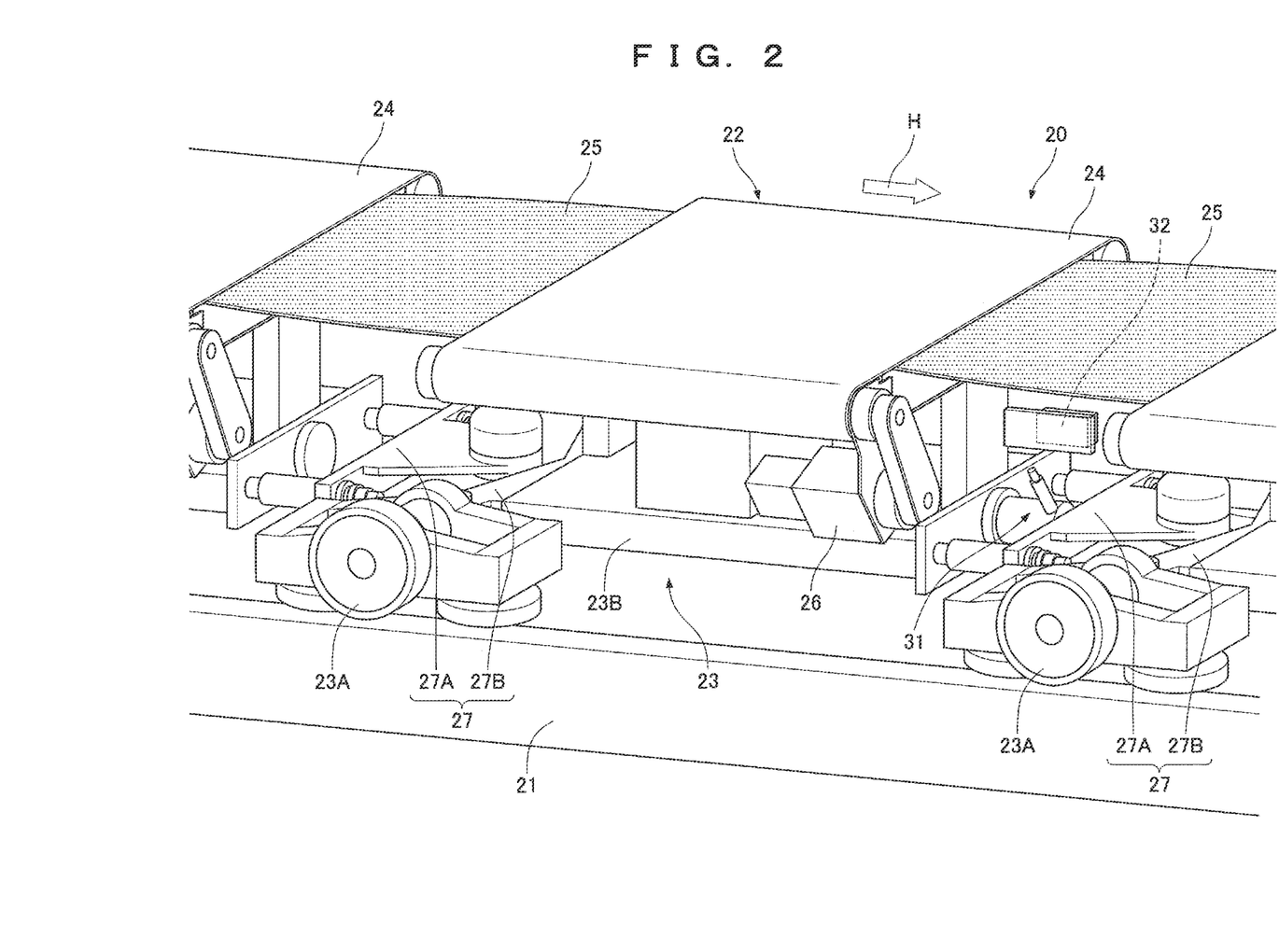
FIG. 2 is a perspective view illustrating a conveyor carriage of the article conveyance apparatus according to the present invention.

As illustrated in FIGS. 1 and 2, the main conveyor device 20 mainly includes rails 21 provided along the conveyance path K and the plurality of conveyor carriages 22 traveling along the rails 21. In the main conveyor device 20, the articles 90 are loaded onto the conveyor carriages 22 from the induction conveyors 40. The conveyor carriages 22 with the articles 90 loaded from the induction conveyors 40 travel on the rails 21, so that the articles 90 are conveyed along the conveyance path K. The articles 90 conveyed by the conveyor carriages 22 are unloaded from the conveyor carriages 22 into the chutes 50.

The conveyor carriages 22 receive the articles 90 loaded from the predetermined induction conveyors 40, at the article-loading positions P. The conveyor carriages 22 convey the received articles 90 along the conveyance path K. The conveyor carriages 22 unload the articles 90 conveyed along the conveyance path K, into the predetermined chutes 50.

Figure 3:
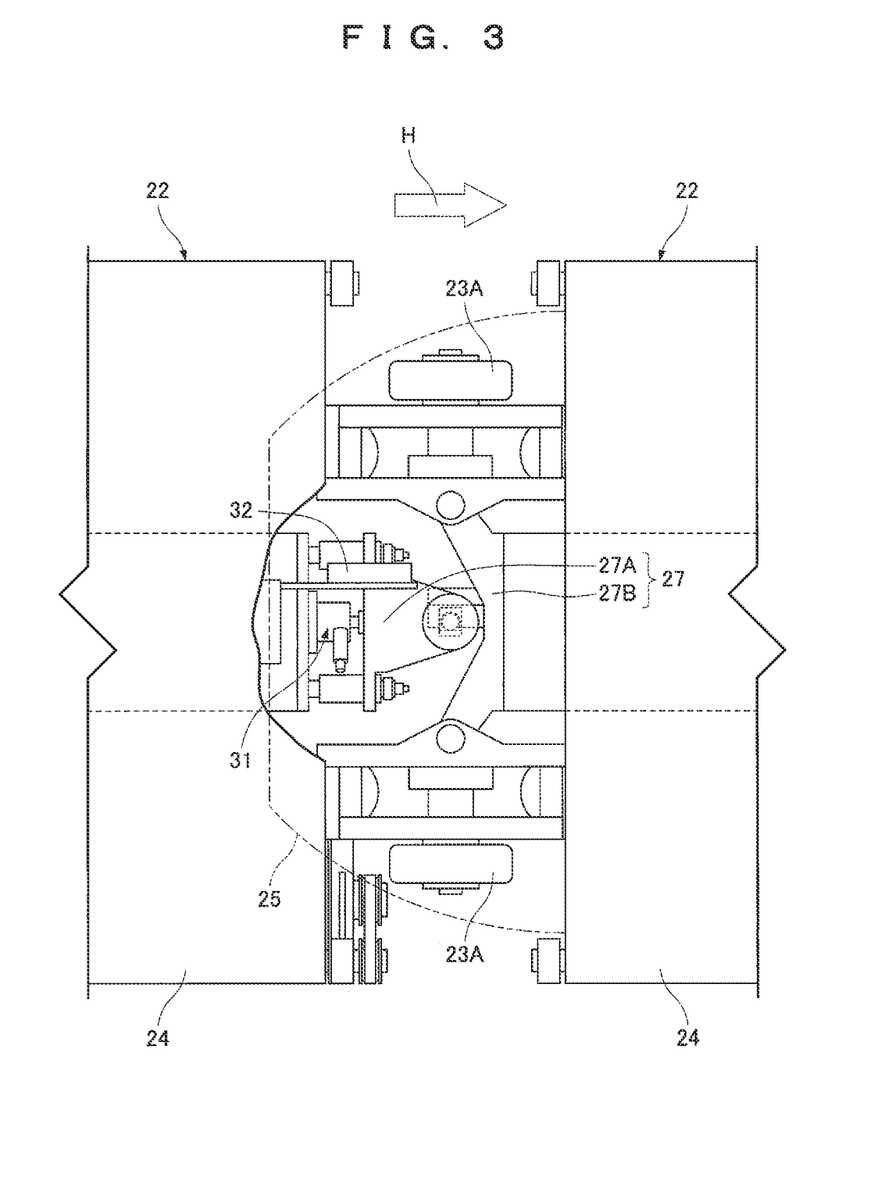
FIG. 3 is a plan view illustrating a coupling part between the conveyor carriages of the article conveyance apparatus according to the present invention.

As illustrated in FIGS. 2 and 3, the conveyor carriage 22 mainly includes a body 23 that travels on the rails 21 and a belt conveyor 24 supporting the article 90 placed thereon.

The body 23 mainly includes wheels 23A for traveling on the rails 21 and a frame 23B supporting, for example, the wheels 23A and the belt conveyor 24.

The belt conveyor 24 is provided on the body 23. The belt conveyor 24 is configured so as to convey the loaded article 90 in a direction orthogonal to the traveling direction H of the conveyor carriage 22. The belt conveyor 24 has a motor 26 for driving a belt. The belt conveyor 24 drives the belt when the conveyor carriage 22 reaches the predetermined chute 50, thereby discharging the article 90 toward the position of the chute 50. If the article 90 on the belt conveyor 24 is displaced from a proper position when being conveyed by the conveyor carriage 22, the belt conveyor 24 drives the belt so as to adjust the loading position of the article 90 to the proper position.

The conveyor carriage 22 is coupled to another adjacent conveyor carriage 22 (another conveyor carriage 22 placed in the longitudinal direction with respect to the traveling direction H of the conveyor carriage 22) on the conveyance path K. The conveyor carriage 22 travels on the rails 21 while being coupled to the adjacent conveyor carriage 22. The conveyor carriage 22 is coupled to the adjacent conveyor carriage 22 by a coupling part 27.

The coupling part 27 mainly includes a projecting portion 27A provided at the front end of the frame 23B and a recessed portion 27B provided at the rear end of the frame 23B. Between the conveyor carriages 22 adjacent to each other in the longitudinal direction with respect to the traveling direction of the conveyor carriages 22, the coupling part 27 couples the adjacent conveyor carriages 22 such that the projection of the projecting portion 27A at the front end of the conveyor carriage 22 traveling ahead is mated with the recess of the recessed portion 27B at the rear end of the conveyor carriage 22 traveling behind the other.

In a gap between the adjacent conveyor carriages 22, a cover 25 is provided over the coupling part 27. The cover 25 includes a plate member covering the gap between the adjacent conveyor carriages 22. The cover 25 is fixed to the rear end (the rear end with respect to the traveling direction of the conveyor carriage 22) of the conveyor carriage 22.

The wheels 23A are pivotally supported on the coupling part 27. In other words, the wheels 23A are provided in the gap between the adjacent conveyor carriages 22. Specifically, the wheels 23A are provided at the recessed portion 27B at the rear end of the conveyor carriage 22 and are pivotally supported on both ends of the recessed portion 27B in the lateral direction (in a direction horizontally orthogonal to the traveling direction H of the conveyor carriage 22).

As illustrated in FIGS. 1 to 3, two of the coupling parts 27 for the respective gaps between the conveyor carriages 22 are each provided with a load cell 31 (an example of "measuring unit") that measures a force applied between the conveyor carriages 22 coupled by the coupling part 27. The load cell 31 is provided for each of the two predetermined coupling parts 27 from among the coupling parts 27 provided for the respective gaps between the conveyor carriages 22. In this configuration, the predetermined two coupling parts 27 are not particularly limited to specific two of the coupling parts 27 (at two locations). The two coupling parts 27 may be two adjacent coupling parts 27 or may be two coupling parts 27 located apart from each other. Specifically, the load cell 31 is provided at the center of the projecting portion 27A formed at the front end of each of the two predetermined conveyor carriages 22 from among the plurality of conveyor carriages 22 traveling along the rails 21. The load cell 31 provided in one of the two predetermined coupling parts 27 is used as a main load cell while the load cell 31 provided in the other coupling part 27 is used as a sub-load cell. The main load cell 31 and sub-load cell 31 provided in the coupling parts 27 simultaneously measure forces applied between the conveyor carriages 22 during the travel of the conveyor carriages 22. Thus, if the force cannot be measured due to a failure or the like of the main load cell 31, a tension T is calculated according to data on the force measured by the sub-load cell 31.

A tension monitoring system for the conveyor carriages 22 in the main conveyor device 20 will be described below.

In the main conveyor device 20, a force applied between the adjacent conveyor carriages 22 is measured, and the tension T between the conveyor carriages 22 is calculated based on the measured value. Furthermore, a force F applied to the wheels 23A provided between the conveyor carriages 22 is calculated based on the calculated tension T between the conveyor carriages 22, and floating of the wheels 23A from the rails 21 is determined based on the calculated result. In other words, a contact state of the wheels 23A with the rails 21 is determined based on the force F applied to the wheels 23A. If the force F applied to the wheels 23A falls below 0 (decreases to a negative value), it is determined that the wheels 23A are floating from the rails 21.

Figure 4A:
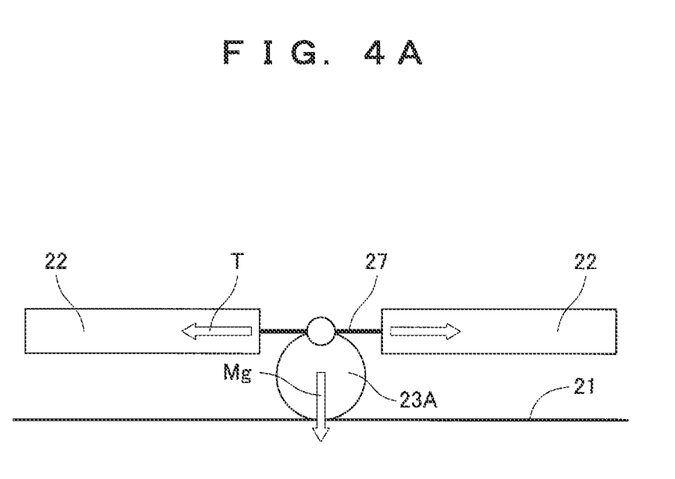
FIG. 4A is a schematic view illustrating a force applied to the wheels of the conveyor carriage when the conveyor carriages of the article conveyance apparatus according to the present invention travel on horizontal rails.
Figure 4B:
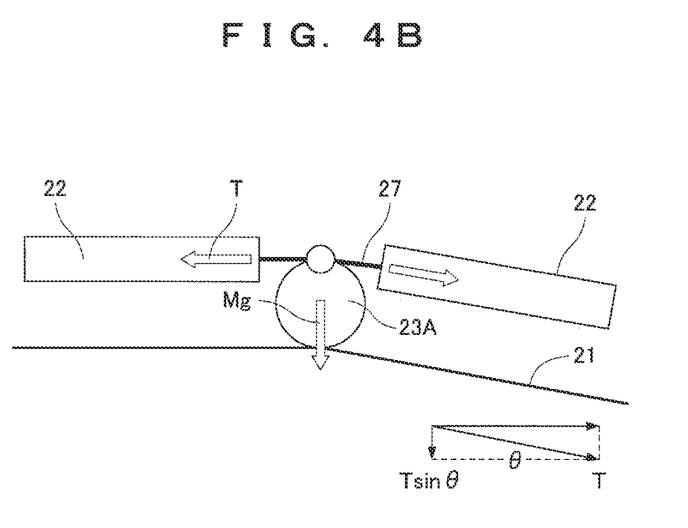
FIG. 4B is a schematic view illustrating a force applied to the wheels of the conveyor carriage when the conveyor carriages of the article conveyance apparatus according to the present invention travel on tilted rails.

As illustrated in FIGS. 4A and 4B, the force F applied to the wheels 23A provided between the conveyor carriages 22 is calculated from a weight Mg[N] of the conveyor carriage 22, the tension T[N] between the conveyor carriages 22, and a tilt angle θ of the rails 21. The tension T is calculated based on the force applied between the conveyor carriages 22 measured by the load cell 31. Specifically, the force F applied to the wheels 23A is calculated by equation (1) below:

$$F = Mg + T \sin \theta \quad (1)$$

where the tilt angle θ of the rails 21 is a predetermined angle for each conveyance path K. The tilt angle θ of the rails 21 may be an angle measured when the tension T between the conveyor carriages 22 is detected.

The force F applied to the wheels 23A increases with the tension T between the conveyor carriages 22 and drops as the tension T between the conveyor carriages 22 decreases. If the force F applied to the wheels 23A is smaller than 0 (negative value), that is, if the tension T between the conveyor carriages 22 decreases so as to apply a compressive force between the conveyor carriages 22, the wheels 23A float from the rails 21. If the force F applied to the wheels 23A is large, that is, if the conveyor carriages 22 are pulled so as to apply a tensile force between the conveyor carriages 22, the wheels 23A do not float from the rails 21.

In this way, the force F applied to the wheels 23A provided between the conveyor carriages 22 is calculated from the tension T between the conveyor carriages 22, allowing a determination on whether the wheels 23A are floating from the rails 21. Thus, the tension T measured between the conveyor carriages 22 by the load cell 31 is periodically monitored during the travel of the conveyor carriages 22, and the travel of the conveyor carriages 22 is stopped when the force F calculated based on the tension T between the conveyor carriages 22 and applied to the wheels 23A becomes 0, thereby preventing the wheels 23A from floating.

The configuration of the tension monitoring system for the conveyor carriages 22 will be described below.

As illustrated in FIGS. 1 to 3 and 5, the main conveyor device 20 includes the conveyor carriage 22 provided with the load cell 31 (an example of "measuring unit") for measuring the force between the conveyor carriages 22 and a transmitter 32.

Figure 5:
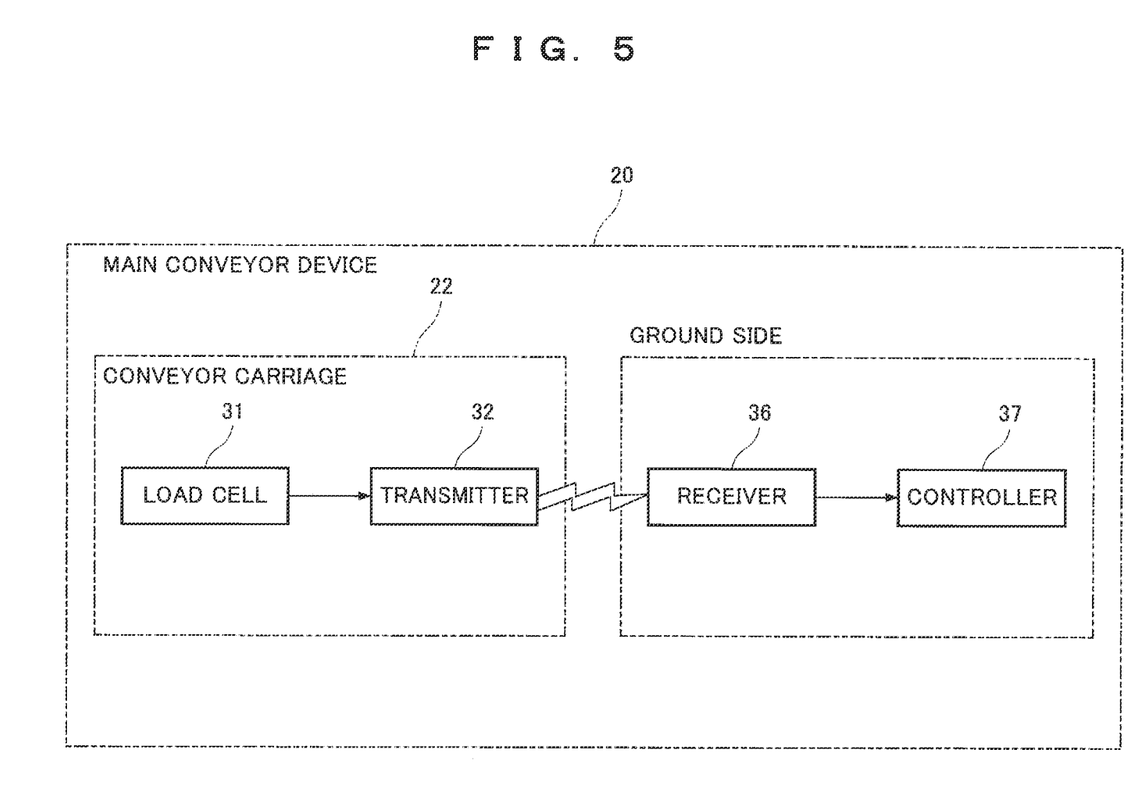
FIG. 5 is a block diagram illustrating the configuration of a tension monitoring system for the conveyor carriages of the article conveyance apparatus according to the present invention.

The transmitter 32 transmits the measured value of the force that is measured between the conveyor carriages 22 by the load cell 31 to a receiver 36, which will be described later. The transmitter 32 is provided on the body 23 (frame 23B) of the conveyor carriage 22 including the load cell 31. The transmitter 32 is connected to the load cell 31. The transmitter 32 transmits a signal from the load cell 31 to the receiver 36.

The main conveyor device 20 includes the receiver 36 and a controller 37 (an example of "tension calculation unit" and "calculation unit") on the ground side (positions other than the conveyor carriages 22) where the conveyor carriages 22 travel.

The receiver 36 receives the signal (the measured value of the force applied between the conveyor carriages 22) transmitted from the transmitter 32. The receiver 36 is provided at a predetermined position on one side of the conveyance path K so as to receive the signal from the transmitter 32 by radio without interfering with the travel of the conveyor carriages 22. The receiver 36 receives the signal from the transmitter 32 when the conveyor carriage 22 including the transmitter 32 travels in the coverage of the receiver 36. Specifically, the force applied between the conveyor carriages 22 is measured, that is, the tension T between the conveyor carriages 22 is detected each time the conveyor carriage 22 including the transmitter 32 travels around the conveyance path K (each time the conveyor carriage 22 including the transmitter 32 travels in the coverage of the receiver 36).

The controller 37 controls the overall main conveyor device 20 and is connected to the units including the receiver 36 in the main conveyor device 20. The controller 37 calculates the tension T between the conveyor carriages 22 based on the measured value of the force applied between the conveyor carriages 22, the measured value being received by the receiver 36. In other words, the controller 37 calculates the tension T between the conveyor carriages 22 based on the measured value of the force applied between the conveyor carriages 22 measured by the load cell 31.

Furthermore, the controller 37 calculates the force F applied to the wheels 23A provided between the conveyor carriages 22, based on the calculation result of the tension T between the conveyor carriages 22. Moreover, the controller 37 determines whether the wheels 23A are floating from the rails 21 based on the calculation result of the force F applied to the wheels 23A. Specifically, the controller 37 calculates the force F applied to the wheels 23A, based on the foregoing equation (1). If the force F applied to the wheels 23A is 0 as a result of the calculation, the travel of the conveyor carriages 22 is stopped at that time. In other words, the controller 37 controls the travel of the conveyor carriages 22 based on the force F applied to the wheels 23A and calculated based on the tension T between the conveyor carriages 22. If the force F applied to the wheels 23A is calculated to be 0, the controller 37 may indicate the stop of the travel of the conveyor carriages 22, in addition to stop the travel, with a warning light or a warning beep, for example.

The controller 37 calculates the force F, which is applied to the wheels 23A, by calculating the tension T between the conveyor carriages 22 based on the signal (the measured value of the force applied between the conveyor carriages 22) transmitted from the transmitter 32 of the conveyor carriage 22 including the main load cell 31. If the force applied between the conveyor carriages 22 cannot be measured due to a failure or the like of the main load cell 31, the controller 37 calculates the force F, which is applied to the wheels 23A, by calculating the tension T between the conveyor carriages 22 based on the signal (the measured value of the force applied between the conveyor carriages 22) transmitted from the transmitter 32 of the conveyor carriage 22 including the sub-load cell 31.

In this way, in the main conveyor device 20, the force that is applied between the conveyor carriages 22 and is used for calculating the tension T between the conveyor carriages 22 is measured by the load cell 31 on the conveyor carriage 22 (by the conveyor carriage 22) while the tension T between the conveyor carriages 22 and the force F applied to the wheels 23A are calculated on the ground side (positions other than the conveyor carriages 22) where the conveyor carriages 22 travel.

As has been discussed, according to the present embodiment, the tension T between the conveyor carriages 22 is calculated by measuring the force applied between the conveyor carriages 22 by means of the load cell 31 provided in the conveyor carriage 22. This can detect the tension T between the conveyor carriages 22 during the travel of the conveyor carriages 22 and eliminate the need for stopping the all conveyor carriages 22 each time the tension T between the conveyor carriages 22 is detected, thereby improving operation efficiency.

Since the force F applied to the wheels 23A is calculated during the travel of the conveyor carriages 22, the floating of the wheels 23A from the rails 21 can be predicted during the travel of the conveyor carriages 22, thereby preventing the wheels 23A from floating from the rails 21.

According to the present embodiment, two of the coupling parts 27 provided for the respective gaps between the conveyor carriages 22 each include the load cell 31, so that the force applied between the conveyor carriages 22 can be measured with a small number of components. Even if the force applied between the conveyor carriages 22 cannot be measured due to a failure or the like of the load cell 31 provided in one of the two coupling parts 27, the load cell 31 provided in the other of the two coupling parts 27 can measure the force, thereby securely detecting the tension T between the conveyor carriages 22.

According to the present embodiment, in the tension monitoring system for the conveyor carriages 22 in the main conveyor device 20, the load cell 31 for measuring the force applied between the conveyor carriages 22 is mounted on the conveyor carriage 22 while the controller 37 for calculating the tension T between the conveyor carriages 22 and the force F applied to the wheels 23A is installed on the ground side other than the conveyor carriages 22. This can measure the force applied between the conveyor carriages 22 during the travel of the conveyor carriages 22 and calculate the tension T between the conveyor carriages 22 and the force F applied to the wheels 23A, without stopping the travel of the conveyor carriages 22.

In the present embodiment, the article support in the main conveyor device 20 (conveyor carriage 22) includes the belt conveyor 24 (self-driven cross-belt type), but the article support is not limited to the belt conveyor 24. Any component capable of supporting the loaded articles 90 may be included in the main conveyor device 20, for example, trays (tilt-tray type not self-driven) may be included.

According to the present embodiment, the two load cell 31 are provided in the two of the coupling parts 27 provided for the respective gaps between the conveyor carriages 22. However, the configuration of the load cell 31 is not limited to this, as long as the force applied between the conveyor carriages 22 can be measured. One load cell 31 may be provided in any one of the coupling parts 27 provided for the respective gaps between the conveyor carriages 22, or three or more load cells 31 may be provided in three or more of the coupling parts 27.

According to the present embodiment, the measuring unit for measuring the force applied between the conveyor carriages 22 is the load cell 31, but the measuring unit is not limited to the load cell 31. Any unit capable of measuring the force applied between the conveyor carriages 22 may be used instead.

According to the present embodiment, the tension T between the conveyor carriages 22 and the force F applied to the wheels 23A of the conveyor carriage 22 are calculated by the same controller 37, but the configuration is not limited to this. The tension T between the conveyor carriages 22 and the force F applied to the wheels 23A of the conveyor carriage 22 may be calculated by different controllers. In other words, the tension calculation unit and the calculation unit may be configured as different controllers.

According to the present embodiment, the tension T between the conveyor carriages 22 is calculated by the controller 37 provided on the ground side (positions other than the conveyor carriages 22) where the conveyor carriages 22 travel, but the configuration is not limited to this. The controller for calculating the tension T between the conveyor carriages 22 may be provided on the conveyor carriage 22, and the tension T between the conveyor carriages 22 may be calculated on the conveyor carriage 22. In other words, the tension T between the conveyor carriages 22 may be detected on the conveyor carriage 22.

REFERENCE SIGNS LIST

10 Article conveyance apparatus
22 Conveyor carriage
23A Wheel
27 Coupling part
31 Load cell (measuring unit)
37 Controller (tension calculation unit, calculation unit)

90 Article
F Force applied to the wheel
K Conveyance path
H Traveling direction
T Tension between conveyor carriages

What is claimed is:

1. An article conveyance apparatus, comprising:
a plurality of conveyor carriages coupled for conveying articles, the coupled conveyor carriages being enabled to travel along a conveyance path, each of the conveyor carriages being coupled by a coupling part to another one of the conveyor carriages placed in a longitudinal direction with respect to a traveling direction of the conveyor carriages, the conveyor carriages comprising a measuring unit that is provided in the coupling part and measures a force applied between the conveyor carriages coupled by the coupling part;
a tension calculation unit that calculates a tension between the conveyor carriages based on the force applied between the conveyor carriages measured by the measuring units;
a calculation unit that calculates a force applied to wheels provided in a gap between adjacent ones of the conveyor carriages, based on the tension between the conveyor carriages calculated by the tension calculation unit; and
a controller that determines whether the wheels are floating based on the force applied to the wheels calculated by the calculation unit, the controller stopping the travel of the conveyor carriages or providing a warning if the controller determined the wheels are floating,
wherein the wheels are possible to float by a compressive force between the adjacent ones of the conveyor carriages.

2. The article conveyance apparatus according to claim 1, wherein the measuring unit is provided in at least two of the coupling parts provided for respective gaps between the conveyor carriages.

3. The article conveyance apparatus according to claim 2, wherein the measuring unit includes a load cell.

4. The article conveyance apparatus according to claim 1, wherein
the measuring unit is provided in the conveyor carriage, and
the tension calculation unit and the calculation unit are provided on a ground side where the conveyor carriages travel.

* * * * *